Figure 15:
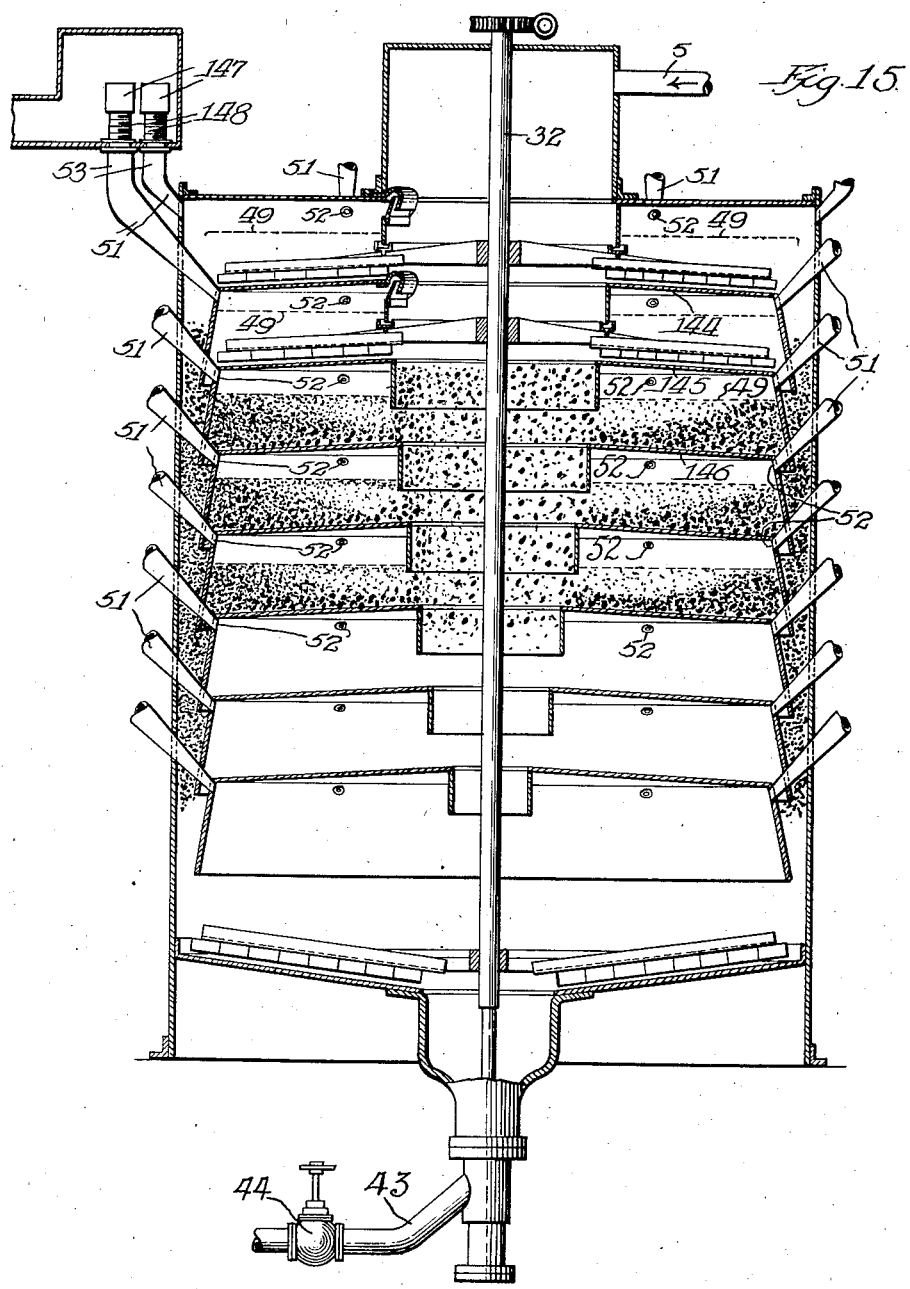

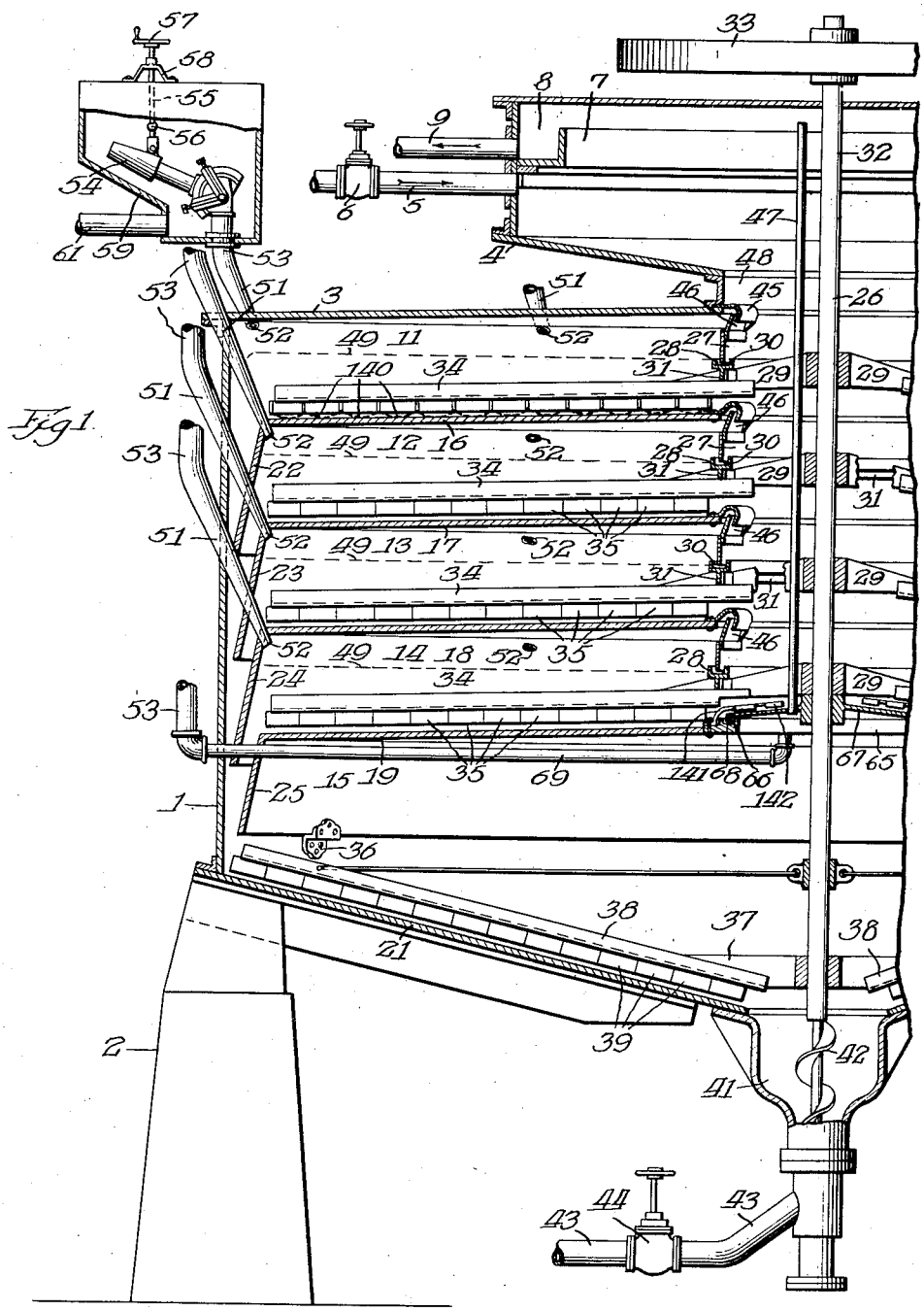

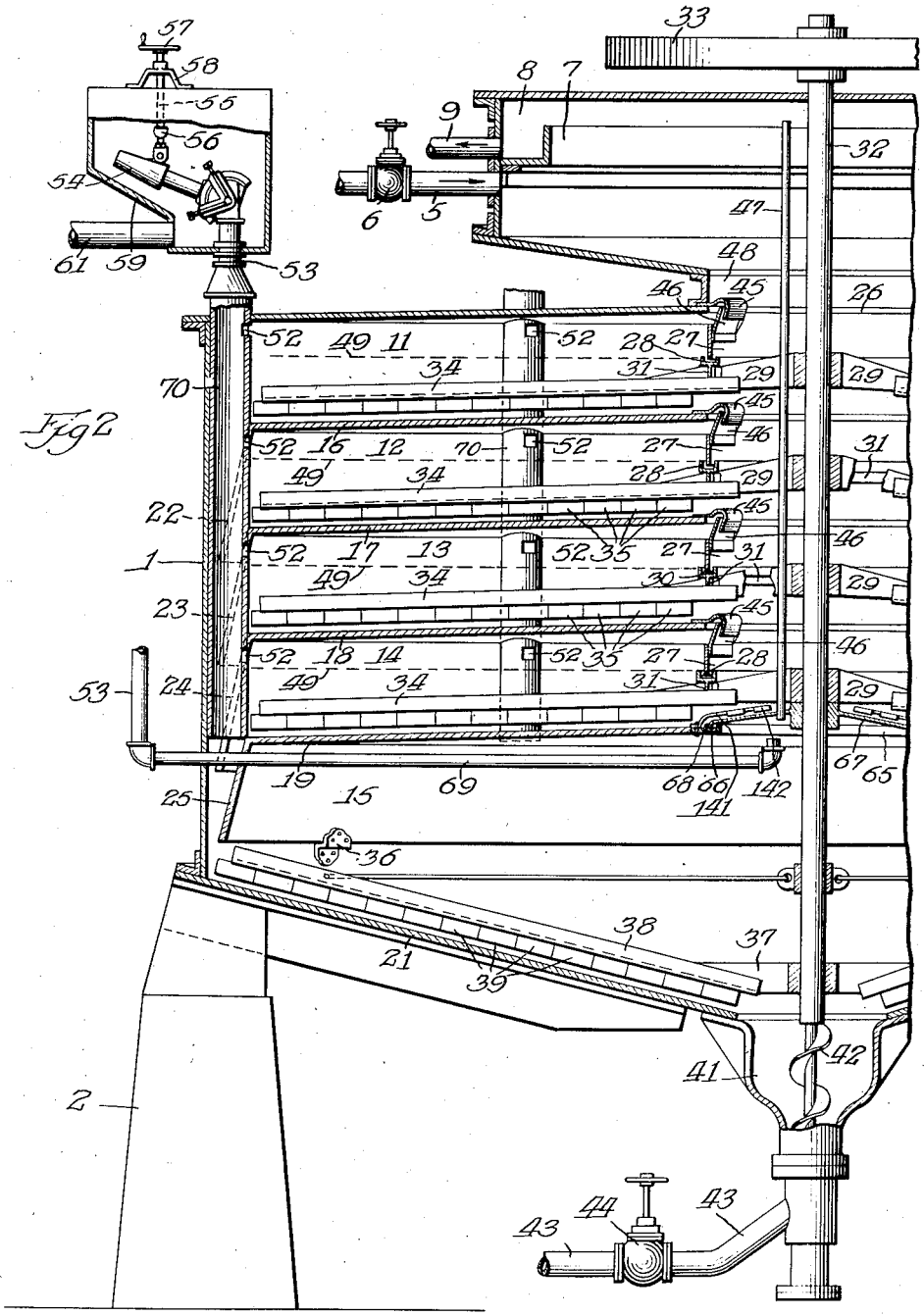

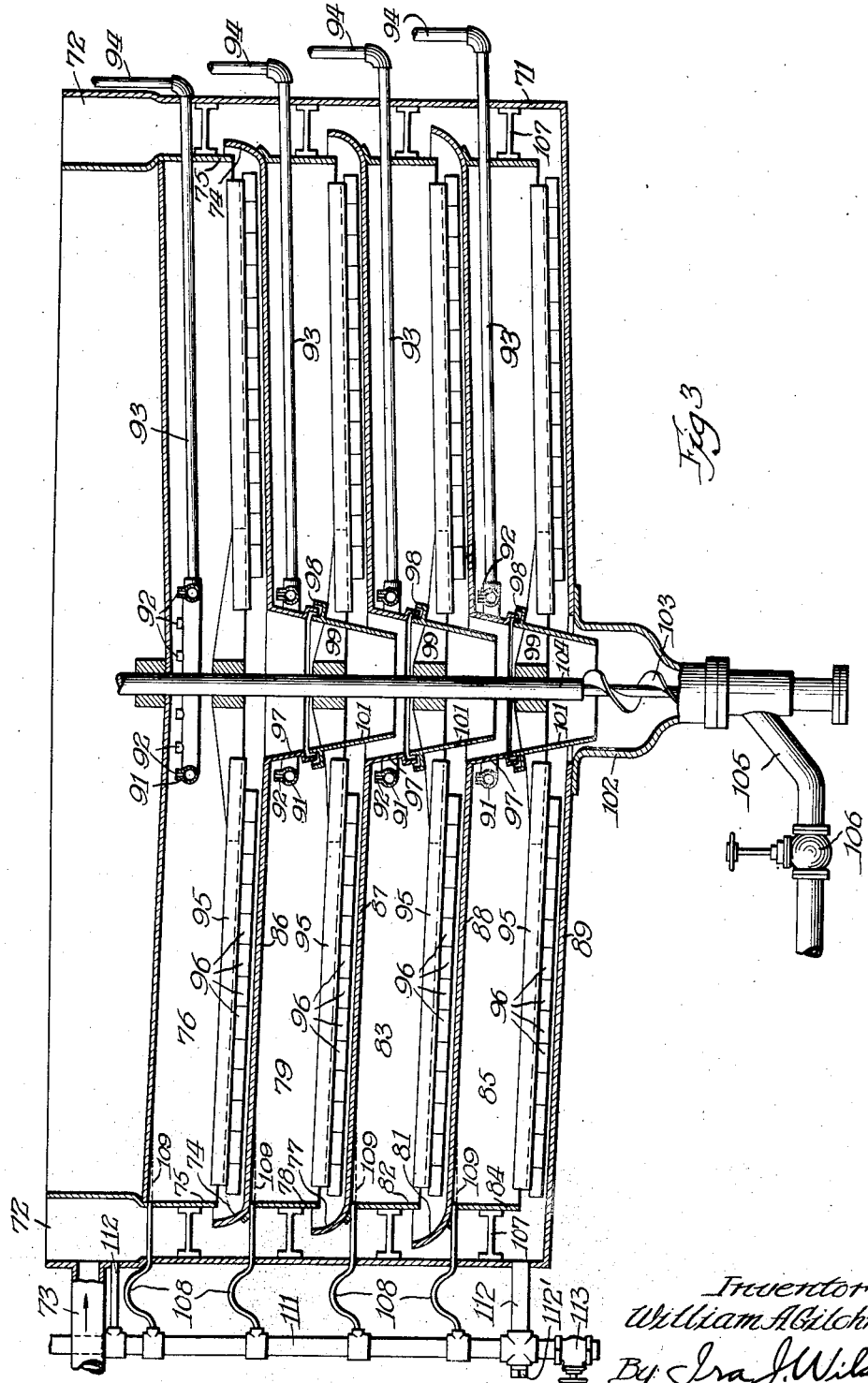

June 4, 1935. W. A. GILCHRIST 2,003,357
APPARATUS FOR CLARIFICATION
Filed Sept. 9, 1929 8 Sheets-Sheet 4
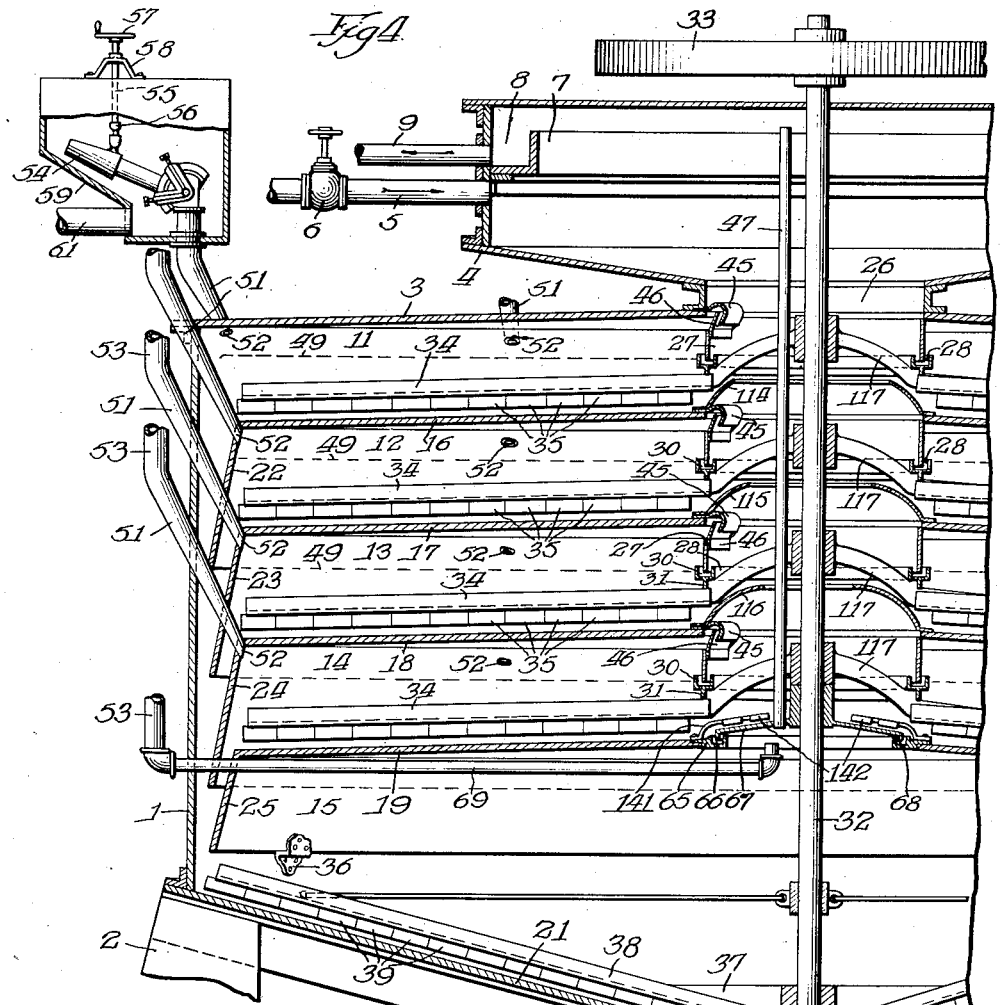
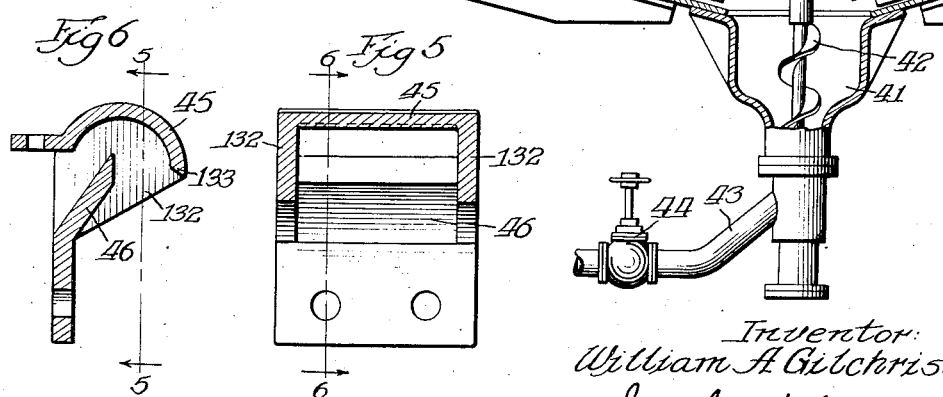
Inventor:
William A Gilchrist
By Ira J. Wilson
Atty June 4, 1935.  W. A. GILCHRIST  2,003,357
APPARATUS FOR CLARIFICATION
Filed Sept. 9, 1929    8 Sheets-Sheet 5
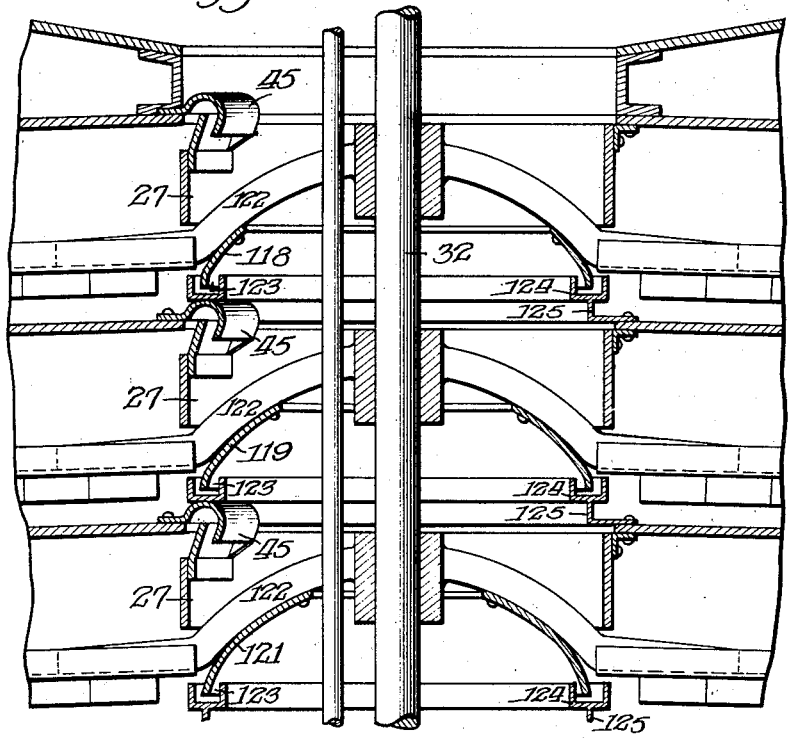
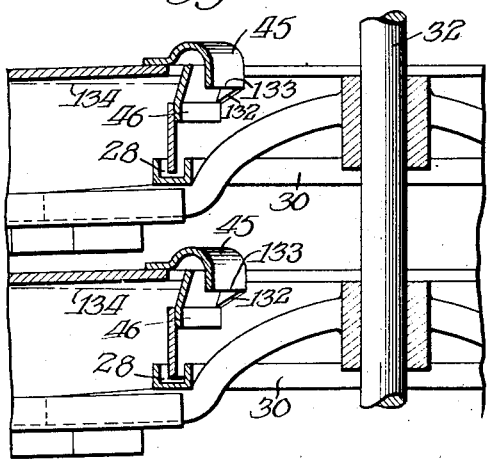
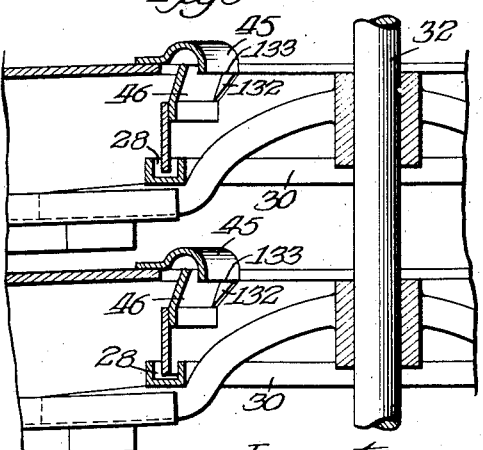

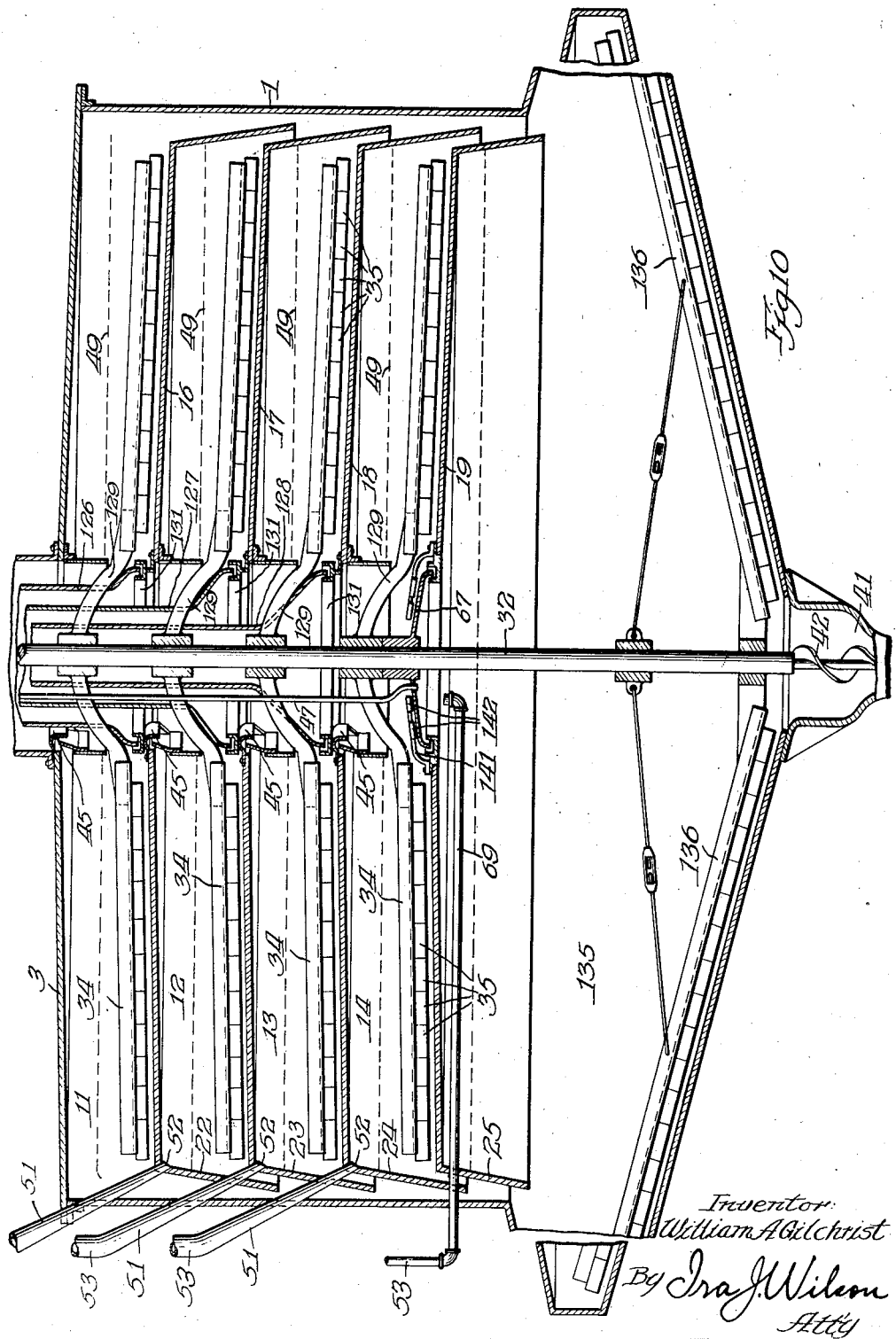

June 4, 1935. W. A. GILCHRIST 2,003,357
APPARATUS FOR CLARIFICATION
Filed Sept. 9, 1929  8 Sheets-Sheet 7
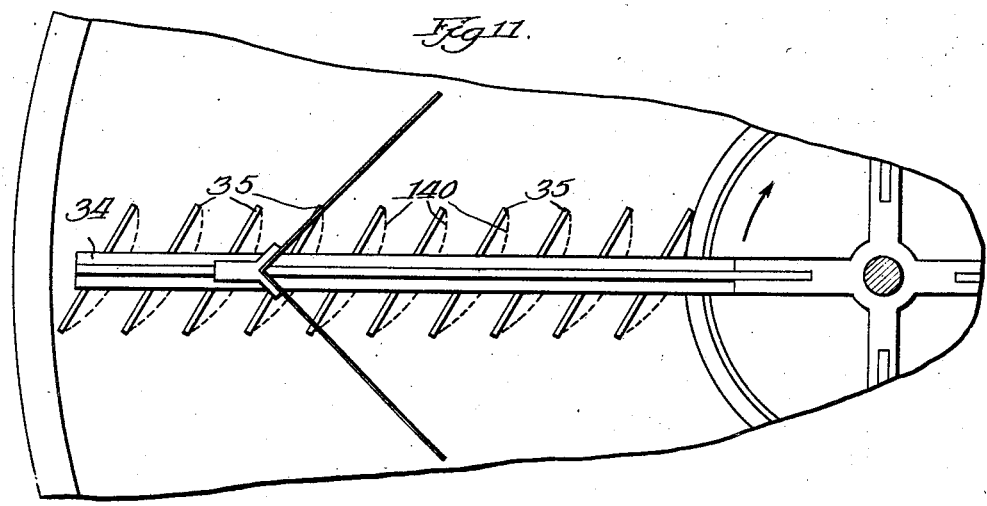
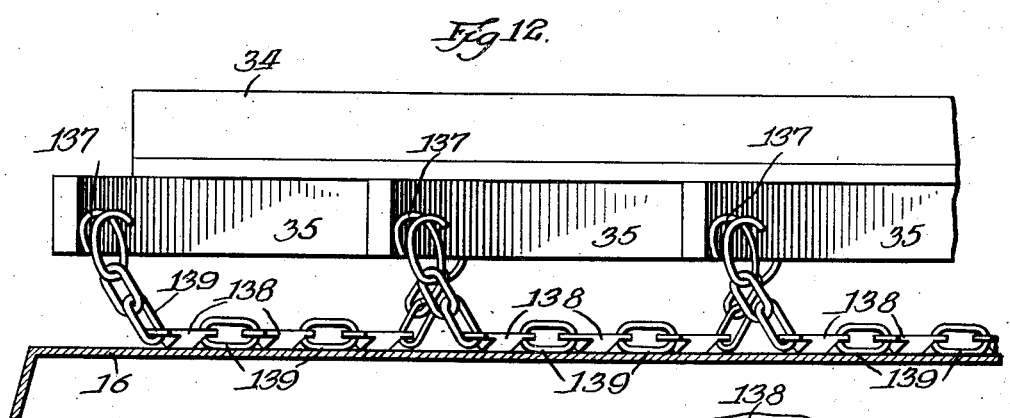
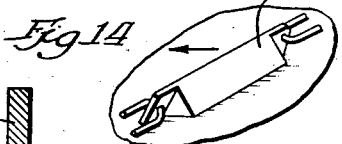
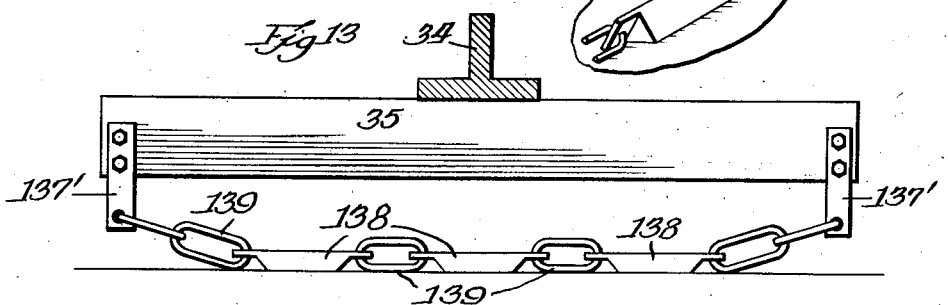
Inventor:
William A. Gilchrist
By Ira J. Wilson
Atty Inventor
William A. Gilchrist
By Ira J. Wilson
Atty Patented June 4, 1935

2,003,357

UNITED STATES PATENT OFFICE 2,003,357

APPARATUS FOR CLARIFICATION

William A. Gilchrist, Chicago, Ill.

Application September 9, 1929, Serial No. 391,427

12 Claims. (Cl. 210—55)

This invention pertains to methods and apparatus for clarification of liquids by agglomeration and settling and is particularly well adapted for continuous clarification of liquids in constant motion and for the successful separation from liquids of sediments ordinarily deemed incapable of efficient removal by either settling or filtration.

A description of some of the methods and apparatus shown in this application is also contained in my copending application Serial No. 383,736, filed August 5, 1929.

In this specification and claims the terms "sediment", "settlings" and "mud" are intended to include any kind of matter carried in suspension by a liquid, whether it be colloidal matter, vegetable fiber or any other matter.

In accordance with this invention the separation from liquids of sediments and particularly light weight sediments is accomplished by a combination of gravitational settling and an action in the nature of filtering which effects agglomeration and consolidation of the sediment particles. The principles of the invention may be carried out in either single compartment tanks or tanks comprising a plurality of communicating compartments through which the liquid and sediment are continuously conducted.

An important feature of this invention resides in the production in the lower portion of each compartment, of a zone of deposited sediment into and through which the liquid to be clarified is caused to flow so as to effect a filtering of the incoming liquid and an agglomeration of the incoming sediment with the sediment already present in said zone.

My invention contemplates also the removal continuously or intermittently from this zone of the sediment deposited therein. This removal is accomplished preferably by moving the sediment in the lower portion of each zone in a direction substantially parallel to the bottom thereof toward a discharge passage through which it is discharged from the respective settling compartments. The liquid being clarified is caused to flow through the clarification zone in a course generally parallel to the movement of the sediment, and when cylindrical compartments are used, as are herein illustrated, both the liquid and sediment move radially outwardly and in substantial parallelism thus obviating, within the clarification zone, those eddies and counter-currents which would retard the settling and impair the agglomeration of the sediment particles.

In accordance with my invention the unclarified liquid is fed into each clarification zone in regulated quantities and at or near the bottom of the zone through which it slowly passes in an outward and upward direction and the clarified liquid rising from said zone is drawn off from the upper portion of the chamber while the sediment removed from the liquid travels in an outward and downward direction to the point of discharge at the bottom of the chamber. The flow of the liquid and the sediment being generally parallel a minimum of disturbance is created and a substantially quiescent condition is maintained throughout the clarification zone and in the upper zone of clearest liquid. These conditions are most favorable to separation of the sediment by gravity settling, filtration and agglomeration from the liquid and also obviate to a maximum degree any liability of resuspension of the sediment in the liquid.

Another feature of this invention is a novel clarified-liquid draw-off means which is so constructed as to reduce to a minimum the liability of becoming clogged by solids or semisolids carried by the liquid.

Another object of this invention is to provide means, which will not be liable to become clogged by solids, for enabling the gases which accumulate in the settling compartments to readily escape therefrom.

Other numerous objects, advantages and capabilities of this invention will be readily appreciated as the invention becomes better understood from the following specification when considered in connection with the accompanying drawings.

Referring to the drawings,

Fig. 1 is a partial vertical sectional view of one form of clarifier embodying my invention, Fig. 2 is a similar view illustrating another form of apparatus for drawing off the clarified liquid, Fig. 3 is a vertical sectional view of a modified form of clarifier providing for peripheral feeding and central discharge of the effluent and sediment, Fig. 4 is a partial vertical sectional view of another form of clarifier embodying stationary vanes at the central inlet apertures for directing the inflowing liquid, Fig. 5 is an enlarged sectional view taken on the line 5—5 of Fig. 6 of a gas trap used in the clarifier, Fig. 6 is a sectional view on the line 6—6 of Fig. 5, Fig. 7 is a fragmentary sectional view of a modified form of feed inlet, Fig. 8 is a fragmentary sectional view of a gas trap similar to that in Figs. 5 and 6, but adapted to trap gas not only within its channel portion but also down to the level indicated by the dash line, Fig. 9 is a similar view of a gas trap adapted to maintain the gas level higher than is shown in Fig. 8, Fig. 10 is a fragmentary sectional view of a modified form of clarifier embodying rotatable feed inlet guide vanes of equal heights to provide extended independent feed inlet channels, Fig. 11 is a plan view of a sweeper arm showing the blades attached thereto and the drag chains diagrammatically indicated by dotted lines, Fig. 12 is a fragmentary section through the settler showing the attachment of the drag chains to the sweep blades in perspective, Fig. 13 is a side elevation of a single sweep blade with the drag chain attached thereto, Fig. 14 is a perspective of one link in a drag chain showing it tilted over in the position it assumes during operation, and Fig. 15 is a central vertical section of another modified form of the clarifier.

Referring now in greater detail to the drawings, Fig. 1 shows a tank 1, known as the clarifier tank or settler tank, mounted on any suitable support such as a pedestal 2 and provided with a top 3 and feed box 4. The unclarified liquid containing the sediment to be removed is introduced through the pipe 5 in quantities regulated by any suitable means such as the valve 6.

Any scum which forms from light weight material entering with the liquid rises to the top and overflows the upstanding collar or overflow rim 7 into the annular trough 8 from which it is discharged through the scum discharge pipe 9. This feature may be omitted where the apparatus is to be used with non-scum forming liquids.

While the principles of my invention may be embodied in a single compartment clarifier, the one shown in Fig. 1 for illustrative purposes comprises a plurality of compartments respectively indicated by reference characters 11, 12, 13, 14 and 15 formed by spaced apart settling trays 16, 17, 18 and 19. Each of these trays provides a settling surface for the compartment directly above it while the settling surface for the bottom compartment 15 is formed by the bottom 21 of the tank. The trays 16 to 19, inclusive, are provided with circumferential depending aprons 22, 23, 24 and 25 respectively, are preferably slightly inclined downwardly toward their perimeters and are each provided with a central aperture as shown. The trays and their depending aprons may be supported firmly in position and free from vibration by any suitable means, as for instance, a number of brackets 36 only one of which is here shown.

The central openings in the trays 16, 17 and 18 provide a common central vertical passage for the downward flow of the incoming unclarified liquid. A depending collar 27 surrounding the central aperture 26 of the tank top has its lower edge disposed in the groove 28 of the ring member 30 carried by the sweep bracket arms 29. The collar and ring member provide a feed conduit the lower end of which is formed by the ring web 31 and beneath which the liquid passes in entering the chamber 11. Similar feed conduits are provided for each of the compartments 12, 13 and 14. The grooves 28 quickly become filled with sediment which in conjunction with the lower margins of the collars 27 submerged in the sediment provide substantially frictionless seals against the inflow of liquid into the settling chambers at these levels.

The brackets 29 in each compartment are fixed on a shaft 32 which is rotated by a pulley 33 or other suitable driving means. Each bracket carries a sweep arm 34 equipped with a plurality of depending short blades 35 spaced apart and set at such an angle as to gradually and gently push the settled sediment along the surface of each tray toward the perimeter thereof. The number of sweep arms and also the number of blades and their inclination may be varied in accordance with the amount and character of sediment to be removed.

The sediment which settles on the trays 16 to 19, inclusive, is pushed radially outwardly by the sweeper blades 35 and eventually falls off the perimetral edge of each of the trays along the outer peripheral surfaces of the aprons 22, 23, 24 and 25, respectively. It should be noted that the aprons 22, 23 and 24 extend downwardly far enough to carry the mud which is discharged along their outer surfaces to a point below the level of the settling trays which underlie them. All of these aprons therefore direct the sediment into a common annular sediment discharge passage emptying into the bottom compartment 15.

The bottom compartment 15 is similarly provided with sweep arms 38 supported by brackets 37 and equipped with blades 39 which are, however, inclined oppositely to the blades 35 so as to move the sediment or mud along the surface 21 toward the center of the compartment into a mud pocket 41 from which it is delivered by the screw 42 into the discharge pipe 43. The rate of discharge may be regulated and controlled by the valve 44.

The unclarified liquid delivered to the clarifying compartments will in many instances carry with it small amounts of occluded and other gases which tend to separate from the liquid. Additional gases may also form in the compartments as a result of decomposition. These gases should be collected and removed so as not to disturb the clarification. Were the gas unable to escape and permitted to accumulate it would occupy space needed for the clarifying liquid and would eventually escape through the clarified liquid draw-off pipes in rushes of bubbles, which would cause a vibration of the liquid in the clarifier and seriously interfere with the settling of the sediment. As these gases rise in the compartments they travel along the bottoms of the inclined trays to the highest point which is near the center of the trays. To permit the escape of these gases, gas outlets or traps consisting of short channel members 45 and upstanding baffle plates 46 are provided as best shown in Figs. 5 and 6. Each trap provides a short channel which opens downwardly on each side of the baffle plate 46. The collars 27 are notched out to accommodate one or more of these traps which are each riveted to a collar below the notch and to the underside of the superposed tray. The upper edge of the baffle extends upwardly in the channel to such a height that as soon as gas begins to escape through this outlet a pocket of gas will be formed which will extend downwardly to a level below the entrance to the channel a sufficient distance to prevent scum from rising into the channel and clogging the passage. The establishment of this gas pocket is aided also by whatever air may have remained in the trap during the filling of the tank. My improved trap is free from stoppage or clogging by scums and the like and contributes to a considerable degree to the successful operation of the apparatus.

Since no scum is liable to be present in the bottom compartment 15 a simple pipe 47 may be used there for discharging gases, although the above described gas trap may be used there also if desired.

The preferred form of the clarifier shown in Fig. 1 operates as follows. The liquid to be clarified is introduced into the feed box 4 through the central aperture 48 of the feed box and thence through the central apertures of the underlying trays. Passing downwardly past the collars 27 and underneath the webs 31 of the channel members 30 the liquid then flows laterally slowly into each individual settling compartment.

The liquid delivered to each compartment enters a zone of separated and partially separated sediment accumulated by reason of previous operation of the apparatus. The zone may be initially established by gravitational settling or any other method capable of accomplishing the desired result. The sediment zone which thereafter serves as a clarifying zone should be several inches deep in each compartment and should extend upwardly above the lower edge of the web 31 of the channel member 30. The depth of each such zone is dependent during operation upon several factors including the outlet valve 44 and the rate of discharge of the sweeper blades 35. If the blades operate rapidly they will, of course, discharge mud from the trays more rapidly while a slower rotation of the blades will result in correspondingly slower discharge of the sediment. The valve 44 controls the rate at which the settled sediment is allowed to escape from the settler. The number of sweeper arms employed and the inclination of the blades carried by them may also be varied in regulating the rate of discharge of the sediment from each tray. The depth of these sediment zones may be varied by other factors such as the changing of the rates of intake and discharge of both the liquid and the solids. It is important, however, to maintain a zone of deposited sediment of sufficient depth so that the incoming flow of liquid will infiltrate through enough of the sediment, as it flows inwardly and upwardly, to deposit in the layer a satisfactory proportion of the suspended matter which it originally contained. On the drawings the dotted lines 49 about midway between the top and bottom of the compartments 11 to 14, inclusive, indicate satisfactory levels at which the top surfaces of the sediment zones may be maintained on each tray.

The liquid entering each of the compartments 11 to 14, inclusive, is directed into the sediment or clarifying zone, and since a relatively large annular aperture is provided at the central portion of each compartment for the inlet of liquid, the rate of flow of the liquid may be maintained at a very low velocity, such for example, as a few feet per hour.

To induce the liquid to flow into each compartment continuously liquid must be withdrawn from the compartment at the same rate at which it enters. Some of this liquid is withdrawn by top flow as a clear effluent through liquid outlet pipes while the remainder passes along with the concentrated sediment by bottom flow down through the mud channels. While various types of liquid draw-offs may be used, one satisfactory means comprises clarified liquid outlet pipes 51, each of which has an outlet port 52 in communication with the interior of the peripheral portion of each compartment. These outlets should be located as shown very close to the ceiling of each compartment so that only the most completely clarified liquid may be withdrawn. As many of these outlet pipes as is desired may be provided for each compartment. The relation between the relative positions of the liquid inlet for each compartment and the liquid outlets for each compartment induces a gentle flow of the liquid radially outwardly and slightly upwardly from the lowermost central portion of each compartment to the uppermost peripheral portion of each compartment. Due to the fact that the liquid delivered to each compartment enters directly into the sediment zone, it must flow, seep or infiltrate radially through the sediment for a considerable distance.

As the liquid flows through this sediment zone it will gradually give up its suspended sediment as a result of several causes including filtering action of the previously settled sediment. The sediment particles coming in with the fresh liquid will naturally tend to adhere to those particles which are already in the compartment and if the rate of flow of the liquid be properly regulated and the depth and density of the layer of sediment properly governed practically all, if not all, of the particles of sediment will be removed by filtration and other causes from the liquid before it rises through the surface of the layer of sediment. The liquid thus rising through the sediment zone in each compartment will then gently flow with ever decreasing velocity radially outwardly toward the outlet ports 52 and thence upwardly through the outlet pipe 51.

The very small sediment particles which would settle very slowly, if at all, in an ordinary settling tank, and which are commonly called stragglers, are here entrapped within the sediment zone and adhere to the larger particles, resulting in the formation of still larger particles by agglomeration. These agglomerated particles by reason of their greater size will have better settling characteristics than the original particles of smaller size had and should any of them escape from the sediment layer into the effluent they will more readily return by gravitational settling to the layer.

It is preferable to direct and control the liquid flow so that when the desired depth of sediment has been attained in each compartment the sediment will have a definite top surface below which the sediment particles are undergoing further compacting and concentration and immediately above which surface lies a substantially deep zone of effluent flowing slowly toward the liquid outlet as the slight amount of solids, if any, remaining in it settles down onto the sediment layer. The surface should remain free from such agitation as would cause resuspension of the solids in the supernatant liquid.

The rate of flow of the liquid may be regulated in a number of different ways as may seem desirable, but for illustrating this invention it will suffice to explain the use of the regulatory apparatus shown in the drawings which through practical operation has been found to be quite satisfactory. The valve 6 may be used to regulate the rate of flow through the inlet pipe 5, or if desired the pressure on the incoming stream of liquid may be varied. Each clarified liquid outlet pipe 51 is connected to a riser 53 which extends upwardly to a discharge spout or nozzle 54. This nozzle is pivotally attached to the riser and its free extremity may be raised or lowered by means of a rod 55 connected to it by a swivel joint 56. The rod may be rotated upwardly or downwardly by means of a hand wheel 57 acting in conjunction with screw threads on the rod 55 engaged with a supporting standard 58. If the hydrostatic pressure in the inlet pipe in the meantime remains constant the raising or lowering of the nozzle 54 will vary the rate at which the liquid will flow into and out of the compartment associated with the respective nozzle which is being lowered or raised. Since each draw-off pipe is connected, preferably with a separate nozzle, the rate of flow through the several compartments may be established at the same velocity or at different velocities in the several compartments.

The rate of liquid flow through a compartment will vary the amount of sediment deposited in each compartment per unit of time, hence proper relations must be established between the rate of liquid flow and the rate of discharge of sediment in order that the sediment layer in each compartment may be maintained at the proper depth to secure efficient filtration.

The clarified, or substantially clarified, liquid flowing out from each discharge nozzle 54 will be discharged into a common trough 59 and will be conducted from that trough through a pipe 61.

The bottom compartment 15 operates preferably somewhat differently from the other compartments. No fresh liquid is conducted directly into it. While the lowermost tray 19 may be manufactured like the other trays which lie above it with a central aperture, yet this central aperture should be closed by a conical member 67 attached to the shaft 32 and rotatable therewith. The periphery of the cone 67 carries a depending flange 68 which extends downwardly into a groove 66 formed in ring member 65 carried by tray 19. When the groove becomes filled with sediment, which will normally occur very quickly, this flange and groove form a seal which effectively prevents the entrance of fresh unclarified liquid into the bottom compartment 15. However, the settling sediment which is discharged from the tops of the trays 16 to 19, inclusive, will carry along with it a small amount of liquid and when this sediment accumulates to a sufficient depth in the bottom compartment prior to being discharged therefrom the weight of one particle upon another will express some of the liquid which will then rise to the top of the compartment. Since the general motion of the sediment in the bottom compartment shown in Fig. 1 is toward the center it is preferable that the liquid rising therefrom also be caused to flow gently toward the central portion of the chamber. Accordingly a draw-off pipe 69 extends to a point near the upper central portion of this lowermost compartment and draws off the clarified liquid. A riser 53 connected to this pipe will also be carried upwardly to the level of the other discharge nozzles 54 and be connected in like manner to a similar discharge nozzle.

In Fig. 1 separate outlet pipes 51 for each compartment are provided, the bottom surfaces of which are inclined to the horizontal at angles greater than sixty degrees to prevent the settling and accumulating on their interior surfaces of small stragglers which might still be suspended in the liquid as it was passing outwardly and upwardly through the draw-off pipes. This angle of inclination of these pipes will cause most any sediment settling on the inner surfaces to slide downwardly and back into the compartments, preferably toward the sediment discharge outlets. In treating some liquids and sediments a certain amount of these stragglers will unavoidably go out with the liquid at times and, if allowed to accumulate in the liquid draw-off pipes, might eventually clog the pipes.

The angle of inclination of draw-off pipes may be varied to meet conditions encountered. For some sediments a 60° inclination is not sufficient to prevent clogging of the draw-off pipes, while in other cases, a little more than 45° will be sufficient to cause the sediment to fall back into the tank. The characteristics of each sediment being handled will therefore determine the minimum degree of inclination for the draw-off pipes.

In Fig. 2 a liquid draw-off passage which is common to all of the compartments is provided. This passage 70 may be cylindrical or have other suitable shapes and will stand vertically in the sediment discharge channel piercing the various aprons, but at all points except its bottom is sealed from the downwardly flowing stream of sediment. It has an open bottom end which will permit stragglers to settle and fall down into the bottom compartment 15. The liquid outlets 52 located in the perimetral portions of these compartments will enable the clarified liquid to flow into the passage and its withdrawal from this passage may be regulated by raising or lowering the discharge nozzle 54.

While the illustrated embodiments of the invention show annular passages for the discharge of sediment disposed beyond the peripheral edges of the trays, it should be understood that other constructions may be provided for the removal of the settled sediment. Primarily, it is important that the sediment be permitted to settle upon and remain long enough on each settling surface so that the many particles may assume a fairly compact mass under the action of gravity. While compacting, they will express and expel some of the liquid which they may contain, in the event that they have a porous or sponge-like consistency, as is true of many kinds of sedimentary matter. When the sediment particles have become satisfactorily compacted, they may be acted upon by the sweep blades and gradually urged to move or flow toward the discharge passages, through which they then will fall in a continuous solid stream. While the layer of sediment is being maintained at the desired depth, there may be intermittent or continuous removal of the compacted sediment from the bottom of the layer accomplished in a variety of ways, all of which will aim to prevent too violent agitation of the sediment layer and its top surface.

When the sediment is removed in the manner disclosed, the sediment zone near the central portion of each chamber will have somewhat less density than the mass of sediment lying near the peripheral edges of the trays. This difference in the density between the central and outer areas of each zone contributes toward the success of the filtering action resulting from the introduction of the liquid into the less dense portions of the zone which permits the passage of the incoming unclarified liquid while simultaneously filtering from the liquid the sediment which it carries. While this filter action will gradually increase the density of the sediment mass where the incoming quantities of sediment are being added, yet when the density of this mass becomes great enough so that the sweep blades may move it, the action of the sweep arms will remove radially outwardly these recently concentrated portions before they become too dense to filter the incoming liquid properly. Also as the heavier compacted sediment near the periphery falls into the annular discharge channels the sediment lying nearer the center will tend to flow outwardly, assisted by the inclination of the tray and the action of the sweep blades. It will be observed therefore that there is a continuous operation in which the central masses of sediment as they become increasingly concentrated by entrapping fresh sediment move radially outwardly for further compacting outside of the zone of filtration, and are replaced by the less dense portions of sediment which will continue to operate as filter material. It is apparent that the sufficiently compacted sediment need not be removed to the periphery of each tray, but may in come cases, where the character of the sediment will permit, be removed more directly from the tray without further movement within the settling chamber.

The less dense sediment in the layer just inside the feed collar in each compartment is prevented from flowing directly out into the feed channel by reason of the entraining action which the incoming flow of liquid would exert to counteract such a flow.

The modified form of the invention which is illustrated in Fig. 3 is designed to have the liquid introduced into the peripheral portions of the compartments rather than into the central portions of the compartments. The sediment and clarified liquid are in this modification removed from the central portions of the compartment which results therefore in a substantially parallel flow of the liquid and the solids radially inwardly. This form of clarifier comprises a tank generally indicated as 71 having an annular feed inlet chamber 72 into which the inlet pipe 73 empties. As the unclarified liquid flows into the feed inlet chamber 73 a portion of it is deflected by the annular inlet vane 74 and flows underneath the annular feed collar 75 into the uppermost compartment 76. Another portion of the incoming stream of liquid is deflected by the inlet vane 77 and passes under the annular feed collar 78, thence into the second compartment 79. In like manner the feed inlet vane 81 deflects another portion of the liquid under the collar 82 into the compartment 83 while the liquid which passes downwardly past the vane 81 will flow under the feed collar 84 into the compartment 85. In this clarifier, as in that shown in Fig. 1, it is also preferred to maintain a substantial zone of sediment on each of the settling trays 86, 87, 88 and 89 so that the liquid which flows in at the perimeter of each compartment may be introduced into such zone and filtered therethrough a considerable distance before emerging from the zone. Thus the desired separation heretofore described will be obtained in this clarifier also and the effluent may be drawn off through the liquid outlet pipes practically free from sediment.

The outlets for the liquid are provided by installing preferably the pipes 91 formed in rings which have at their tops short nipples 92 which are open at the top to admit only the clearest of the effluent which lies close to the ceiling of each compartment. Each of these ring shaped pipes is connected with a draw-off pipe such as the pipes 93 each of which has a riser 94. For regulating the discharge from these risers one may attach if he prefers nozzles similar to the nozzles 54 shown in Fig. 1, or some equivalent means may be utilized for regulating the flow from these risers.

While the clarified liquid is being drawn off the sediment which has been gradually accumulating on the trays will also be gradually discharged therefrom partially under the influence of its own weight and somewhat with the assistance of the sweep arms 95 and blades 96 which they carry and which are spaced apart and inclined in a well known manner for the purpose of urging the movement of the sediment. This sediment is discharged centrally from the top tray through the central opening and falls down past the depending collar 97 which is rigidly attached to the top tray. This collar 97 terminates within the groove in the mud seal member 98, the latter being an annular member affixed to the sweep arm bracket 99. The groove in the member 98 will become filled with mud or sediment from the passing stream of discharging sediment to form with the lower edge of the collar 97 a substantially frictionless seal preventing contamination of the clear effluent flowing into the draw-off pipes 91. The lower portion of the collar 97 is somewhat offset to provide the proper seal and yet deflect the downwardly flowing mud past the inner edge of the mud seal groove. The mud passing the mud seal will continue downwardly guided by the frustro-conical collars 101 which are carried by the sweep arm brackets 99. Similar collars 97 and 101 are provided in the other compartments to function in the same manner.

From the bottom compartment the sediment is discharged down into a collecting chamber 102, which may be larger than shown, where it is joined by the sediment discharged from the superimposed compartments. All of this sediment is thereupon agitated downwardly by the helical blade 103 carried on the shaft 104 to which the sweep arms are also attached. The sediment is then discharged out through the pipe 105 and its passage is regulated by means of the valve 106.

The feed inlet vanes 74, 77 and 81 extend different radial distances from the center of the tank so that they may project into the feed channel 72 in positions assuring that they will deflect into each of the several compartments about the same proportion of solids and liquids. They are especially adapted to deflect equal proportions of the rapidly settling heavy sediment particles to thus promote uniform filtering and settling conditions in the various compartments.

While the manner of mounting the annular feed collars 75, 78, 82 and 84 rigidly within the tank may be varied, brackets 107 attached to the feed collars and to the outer wall of the tank are here shown as illustrative.

Should any air or gas accumulate within the compartments shown in Fig. 3, such gas will rise to the ceilings of the respective compartments and following the inclination of the ceilings reach the peripheral confines of the compartments where the gas then escapes through the respective traps 108. Each of these traps comprises a pipe formed as shown in Fig. 3 with its outer end at a lower level than its inner end so that not only will the gas accumulate in the upwardly curved portion but it will also fill the entire inner end of the pipe and a gas pocket will be held in each compartment above the dotted line 109. Thus a substantially large disengagement area will be provided in which the gas may escape from the liquid. Also, should any scum form on the surface of the liquid in each compartment, it will be held back by the pocket of gas and prevented from entering and clogging the pipe 108. The outer ends of the traps 108 are connected to a common riser 111. In order to provide the proper hydrostatic balance in the riser 111 to assure the proper working of the traps pipes 112 establish communication between the interior of the riser and the incoming liquid in the feed channel 72. A plug 112' is provided for cleaning out the lower pipe 112 whenever necessary. A valve 113 is provided on the bottom of the riser 111 for draining when desired and for the removal of such sediment as may collect in the riser.

The tank shown in Fig. 3 may be equipped if desired with a bottom compartment of ample size to serve as a compression chamber for sediment collected therein prior to discharge from the tank.

Three other modifications of the feed inlet construction are shown in Figs. 4, 7 and 10. Each of these is intended to be used with a settler having a central feed and peripheral discharge of both its sediment and liquid. In either of the three cases the liquid draw-off means may be the inclined pipes shown in Fig. 4 or some other satisfactory means for discharging the clear liquid from the peripheral portions of the several chambers.

The construction shown in Fig. 4 is identical with that shown in Fig. 1 except for the use of the stationary feed inlet vanes 114, 115 and 116 which protrude in the manner disclosed into the central feed channel to different extents so that if any heavy sediment be falling vertically in the central feed channel equal portions will be deflected into each of the several compartments. Otherwise the settler shown in Fig. 4 operates in the same manner as does the settler shown in Fig. 1. In order to co-operate with the inclined feed vanes the sweep arm brackets 117 are also inclined upwardly so that they will clear the feed vanes.

In the modification shown in Fig. 7 feed inlet vanes 118, 119 and 121 are rigidly connected to the inclined sweep arm brackets 122 so that they rotate therewith. These feed vanes function in the same manner and for the same purposes as do the feed vanes shown in Fig. 4 to deflect the incoming liquid into the several compartments. However, in this instance, the liquid is permitted to flow in directly under the feed collars 27, and the grooved channel member 30 shown in Figs. 1 and 4 is omitted. The lower extremities of the feed guide vanes 118, 119 and 121 terminate in mud seal grooves which are provided in the channel members 124, the latter being rigidly secured to the underlying trays and having depending legs 125 which prevent any liquid or sediment from falling between the lower edge of these revolving feed vanes and the central apertures of the trays. The modification shown in Fig. 7 will therefore operate substantially the same as does the modification shown in Fig. 4.

In Fig. 10 there are shown revolving feed guide vanes 126, 127 and 128 fixed to and carried on the sweep arm brackets 129. These feed guide vanes are extended upwardly into the downwardly flowing stream of liquid to ensure that the liquid introduced into each compartment will have the same proportion and character of sediment as is introduced into each of the other compartments resulting therefore in uniform filtering action in all of the compartments. As is obvious from the drawings the upper portions of these guide vanes are cylindrical. Their lower ends flare outwardly and terminate within the grooves provided in the channel members 131.

The bottom compartment 135 has a much larger diameter than the superimposed compartments for the purpose of providing an enlarged space for retaining the sediment discharged from the upper trays a longer time than it may be retained in the bottom compartment of the settlers such as are shown in Fig. 1. Provided no adverse effect upon the composition of the liquid or of the sediment will occur by prolonging the settling period it may be in some instances desirable to use this form of bottom compartment. By allowing the sediment to remain therein a longer unit of time with relation to the rate at which the liquid is being settled the sediment particles are enabled to attain a greater concentration by more closely compacting in this bottom compartment as a result of their own weight. Accordingly the sediment at the bottom of the compartment should attain a greater density than would be attained in the bottom compartment of Fig. 1 prior to its discharge by action of the long sweep arm 136. The liquid expressed from the compacting sediment particles would naturally rise from the top of this compartment and be drawn off therefrom by means of the liquid outlet pipe 69. With the exception of the difference in the bottom compartment and the differences in the feed inlet means the settler shown in Fig. 10 will operate much the same as the settler shown in Fig. 1.

Whereas in Figs. 1 and 2 the entraining action of the liquid flowing into each compartment assisted by the inclination of the trays prevents the flow of settled sediment from the trays back to the feed channels, in Figs. 3, 4, 7 and 10 the feed deflectors or feed guide vanes assist the entraining action more positively in preventing such an undesired reverse movement of the previously settled sediment into the feed channels.

Figs. 5, 6, 8 and 9 illustrate in some detail the construction of the gas traps such as are shown and described in connection with Fig. 1 and used also in the other modifications of the settler. Each gas trap has a baffle 46, a curved channel member 45 and end walls 132 all of which co-operate to maintain a trapped quantity of gas within the channel member 45 down to the level determined by the lower extremity 133 of the channel member. In Figs. 8 and 9 this lower extremity 133 is shown at different levels. In Fig. 8 it is low enough so that the gas pocket will extend back into the compartment as low as is indicated by the dash line 134. As explained before, by extending the gas pocket back into the compartment in this manner a larger disengagement area for the separation of the gases from the liquid will be provided and the scums will be held back from entering into and clogging the gas pocket within the channel member 45. If no scums are likely to arise in the compartments the gas trap shown in Fig. 9 may be used which has the lower extremity 133 of the channel member positioned somewhat higher so that the gas pocket will not extend back into the compartment. This construction would be preferred where scums are absent and where the contacting of the liquid with any considerable amount of air or gas might accelerate decomposition or other chemical processes which might have a harmful effect upon the liquid which is being clarified.

In Figs. 1, 2, 4 and 10 a conical member 67 is shown at the bottom of each central feed channel for deflecting the inflowing fluid into the compartment above the adjacent settling tray 19. In order to keep this conical member free from accumulations of settlings there may be provided, if desired, a stationary sweep arm 141 secured in any suitable manner to the tray and carrying thereon blades 142 which are mounted in a fashion similar to the sweep blades 35. As the conical member 67 rotates the stationary sweep blades 142 will discharge any settled sediment onto the tray 19.

In Fig. 15 there is shown another modification of the clarifier the distinguishing feature of which is the central feed channel for the several superimposed trays. In view of the fact that there may be present in the liquid under treatment a considerable quantity of heavy sediment which might fall vertically with considerable rapidity, this modification of the settler provides another manner of insuring that substantially equal proportions of the heavy sediment will enter the several compartments thereby producing similar filtering conditions in all the compartments. Accordingly the trays 144, 145, 146 and the others in like manner are disposed in the stepped arrangement shown in the drawings with central apertures of successively smaller diameters in the order named so that each lower tray protrudes further into the central feed channel than does the tray immediately above it, enabling each of the trays in an obvious manner to have deposited upon it about the same proportion of vertically falling sediment as falls upon the inwardly protruding edge of the tray above it. Each compartment will be provided with sweep arms and blades, as are the other modifications of the clarifier. In Fig. 15 sweep blades have been omitted from some of the compartments to simplify the drawings and black dots are employed in some compartments to show the different concentrations of sediment that will occur in various parts of the apparatus during operation. Gas vents and mud seals, though shown in only two compartments, may be provided in all the compartments if desired, and will function in the manner described heretofore. With this arrangement of trays not only will similar filtering conditions be established in the various compartments, but the compartment interiors will be conveniently accessible to repair men and especially so in the large size settlers where the repair men may climb down through the central feed channel to make any needed repairs. Inclined draw off pipes, or other suitable objects, may be provided for the clarified liquid. In the preferred embodiment shown in Fig. 15, outlet pipes 51 are connected with risers 53 and have at their upper ends internally threaded collars 147 which may be screwed upwardly or downwardly on the threads 148 in order to vary the effective levels of the discharge ends of these draw off pipes. Of course other suitable means may be provided for regulating the discharge of the clarified liquid. This clarifier will operate generally in the same manner as do the previously described clarifiers having central feed inlets.

In actual use of the clarifier it is preferred to have the sweep blades elevated some distance above the trays over which they rotate, preserving an average clearance of perhaps one-half inch to one inch, as may be desired, in order that if the trays become warped during fabrication or afterwards the sweep blades will nevertheless be clear of the trays as they rotate. If the blades actually scraped over such uneven tray surfaces the agitation of the liquid caused thereby would seriously retard settling. Accordingly it is preferred to attach to the sweep blades flexible scraping means such as drag chains indicate diagrammatically by dotted lines 140 in Figs. 1 and 11 and more fully disclosed in Figs. 12 to 14, inclusive, and rely on these chains to follow the undulations of the trays and dislodge whatever sediment might collect below the reach of the sweep blades. Preferably these drag chains are composed of short links and relatively longer bars, the bars having considerable weight and preferably sharp edges which will scrape along the surfaces of the trays.

When the drag chains are used in combination with the sweep blades they can be connected thereto in any suitable manner, and may be attached by means of the hooks 137 or depending arms 137', the former being welded to the sweep blades. The ends of each drag chain will be connected one to the ends of a corresponding sweep blade, as indicated in Fig. 11, and will drag in a loop behind their supporting sweep blades and positively urge the deposited sediment toward the sediment outlets. During operation each bar 138 connected between the small links 139 will roll over and assume the position shown in Fig. 14 presenting one scraping edge against the top surface of the tray.

It should be understood that other flexible drag means may be used and that the drag chains may be composed of other arrangements of bars and links and that they may be carried by the sweep arm otherwise than by attachment to the sweep blades. In fact in some cases sweep blades may be omitted and supporting arms for the drag chain supplied in their stead. However, where the combination of drag chain and sweep blade is employed the chain will dislodge from the surface any sediment deposited there and agitate it upwardly into the more or less fluid sediment layer where it may be engaged by the sweep blade and further urged toward the sediment outlet. In some processes these chains are highly useful for dislodging heavy sediment which might deposit below the reach of the sweep blades and promote septic conditions if allowed to remain on the tray surfaces.

In each modification of the clarifier shown in these drawings, although the settling trays are preferably slightly inclined to aid in the removal of the sediment, yet the constructions permit a layer of sediment and a supernatant layer of effluent to extend throughout the entire interior of each compartment, thus yielding the maximum possible disengagement area between the liquid and the sediment layer in each compartment. A consequence of this is that the liquid rising slowly through the clarification zones may gently and gradually be disengaged and freed from the sediment over the maximum area, resulting in the minimum of disturbance during this disengagement and the minimum of velocities of liquid flow during the separation.

It is recognized that the action occurring when the incoming liquid enters the previously formed sediment zone and flows through it some distance horizontally thence upwardly is an action somewhat different from that which is ordinarily termed filtering. In commercial practice at present filtering is said to occur when a liquid containing sediment is caused to flow through a resisting medium such as a body of sand or wool or a fibrous material such as a paper filter. In this case the solid substance which resists to some extent the passage of the liquid and which separates from the liquid whatever suspended matter it may carry is a permanet structure generally not formed from the same materials as the sediment which the liquid carries. However, in the operation of this clarifier the filter material is the previously deposited sediment of the same character as the incoming sediment which agglomerates with it. Hence it may not be proper to refer to the action occurring in these settlers as a filtering action. It might be called percolation or infiltration but even these terms might not thus be used with the precise meaning which they have heretofore had. The absence of a term which could be applied with precision to this action seems to be due to the fact that a filtering action of the character here disclosed has not heretofore been performed or at least if performed has not come to the attention of the lexicographers. However, it must be clear from a perusal of this specification just what the action is and how it may be performed and no misunderstanding need arise when the terms filtering, infiltration or percolation are used in the specification or claims, as in each instance the action referred to is that action which is understood to occur in clarifiers or settlers constructed and operated as explained in this specification.

The principles of this invention are described above in their application to the problem of clarifying liquids but it should be understood that this invention may also be used in the clarification of other fluids such as air or gas which contain sediment.

It should be understood that some of the features of this invention may be employed in clarifiers which are not cylindrical as are those here in shown and that one or more compartments may be used as desired. The diversion of sediment and fluid in equal proportions and of like characteristics into several clarifying zones may be performed within the scope of this invention in constructions other than superimposed compartments. Many modified constructions may be devised which will employ the principles and possess the advantages above described and yet remain within the scope of the invention as defined in the claims which follow.

Having shown and described this invention, I claim:

1. In a tank having a plurality of superimposed compartments adapted to contain liquid, means for discharging gas trapped above a body of liquid in each compartment comprising passages upwardly bent intermediate their ends communicating respectively with the interior of each compartment and extending outwardly therefrom, and means for regulating the escape of gas through each passage to retain a gas pocket in the upwardly bent portion of each passage.

2. In a tank having a plurality of superimposed compartments adapted to contain liquid, means for discharging separately from each compartment gas trapped therein above a body of liquid comprising a passage extending outwardly from the interior of each compartment and having intermediate its ends an upwardly bent portion for accumulating and retaining a pocket of gas, the outer end of each said passage being submerged in liquid in a manner adapted to retain a gas pocket in the passage positioned to prevent the rise of non-gaseous material into said passage.

3. In a clarifier having a plurality of superimposed settling compartments, gas outlets for several of the compartments each outlet comprising a passage having an upwardly bent portion intermediate its ends for trapping therein a pocket of gas.

4. In a clarifier having a plurality of superimposed settling compartments, gas outlets for several of the compartments, each outlet comprising a passage having an upwardly bent portion intermediate its ends for trapping therein a pocket of gas, the receiving end of said passage being adapted to collect gas accumulating in its respective compartment, the outer end of said passage being submerged in a liquid and under a hydraulic head sufficient to maintain said gas pocket in the passage.

5. In a clarifier, a tank having a plurality of superimposed compartments therein whose peripheral limits are spaced inwardly from the sides of the tank, outlet means for withdrawing clarified liquid from each compartment including separate conduits connected with each of several compartments inclined at greater than 45° but much less than 90° to the horizontal for preventing accumulation of settled matter on the interiors of said passages, sweeps being provided in each compartment moving over the bottom surface thereof for discharging settled sediment.

6. In a clarifier, a tank having a plurality of superimposed compartments therein whose peripheral limits are spaced inwardly from the sides of the tank, outlet conduits for withdrawal of clarified liquid from said compartments inclined at greater than 45° to the horizontal for preventing accumulation of settled matter on the interiors of said passages, said conduits being connected to the upper outer peripheral portions of said compartments and extending upwardly outside of the reach of the associated sweeps, sweeps being provided in each compartment moving over the bottom surface thereof for discharging settled sediment.

7. A clarifier comprising a tank having a plurality of superimposed compartments, each compartment having a tray for receiving sediment deposited thereon, means for regulatably discharging sediment from each tray and for maintaining a substantially deep zone of sediment on each tray, liquid feed inlet means for each tray adapted to direct the liquid below the top of and into the interior of each respective zone, a vertical passage for supplying liquid to each of said inlets, and liquid deflecting means associated with each compartment extending into said passage arranged to divert into the several compartments equal proportions of sediment vertically falling in said passage.

8. A clarifier comprising a tank having a plurality of superimposed compartments, each compartment having a tray for receiving sediment deposited thereon, means for regulatably discharging sediment from each tray and for maintaining a substantially deep zone of sediment on each tray, liquid feed inlet means for each tray adapted to direct the liquid below the top of and into the interior of each respective zone, a vertical passage for supplying liquid to each of said inlets, and liquid deflecting means associated with the feed inlets of the compartments arranged for deflecting into the several compartments approximately the same proportions of liquid and sediment.

9. In a clarifier, two wall members for guiding the movement of a sediment-bearing fluid within said clarifier, one of said members having an upwardly facing grooved portion, the other member having a tongue portion extending downwardly loosely into said groove, the two members being movable relatively to each other, said groove being adapted to receive and retain sediment deposited from said fluid to form a substantially frictionless seal between the tongue and groove for restricting fluid flow therethrough.

10. In a clarifier, a wall member for guiding the movement of a sediment-bearing fluid within said clarifier, a movable bracket member adapted for moving deposited sediment, one of said members having an element carrying an upwardly facing groove, the other member carrying a tongue extending downwardly loosely into said groove, the tongue and grooved element being movable relative to each other, the groove of said element being adapted to receive and retain sediment deposited from said fluid to form a substantially frictionless seal between the tongue and groove for restricting fluid flow therethrough.

11. In a multiple tray settler, a plurality of superposed trays for dividing the tank into compartments, said trays having central inlet channel apertures and being inclined downwardly away from said apertures but insufficiently inclined to cause sediment layers thereon to flow away from said apertures, an annular collar sealed to and depending from each tray aperture down nearly to the next underlying tray to cause liquid entering each compartment to pass under it and filter through pre-deposited sediment on the underlying tray, the outlets for settled sediment and clarified liquid being located at the peripheral outer portions of each compartment, and gas outlets for the compartments located at the junctures of the trays and their associated depending collars, each gas outlet comprising an open-ended passage having an upwardly bent portion intermediate its ends for trapping therein a pocket of gas.

12. A clarifier comprising a tank provided with trays dividing it into a plurality of superimposed compartments, a passage for supplying fluid in a downwardly moving stream to said compartments, means projecting from successive trays successively further into the downwardly moving stream for diverting into the compartments substantially equal proportions of the vertically falling larger sediment particles, and means for withdrawing sediment and fluid from the compartments.

WILLIAM A. GILCHRIST.